United States Patent [19]

Miyazawa

[11] Patent Number: 5,146,551

[45] Date of Patent: Sep. 8, 1992

[54] SYSTEM FOR GENERATING A CIRCULAR OR ELLIPTIC ARC ON A DIGITAL DISPLAY

[75] Inventor: Atsushi Miyazawa, Kawasaki, Japan

[73] Assignee: International Business Machines Corporation, Armonk, N.Y.

[21] Appl. No.: 853,572

[22] Filed: Apr. 18, 1986

[30] Foreign Application Priority Data

Apr. 26, 1985 [JP] Japan .................. 60-89088

[51] Int. Cl.[5] ............................ G06F 15/20
[52] U.S. Cl. .................................... 395/142
[58] Field of Search .................. 382/44–47; 364/518–520

[56] References Cited

U.S. PATENT DOCUMENTS

| 4,283,765 | 8/1981 | Rieger ........................... 364/520 X |
| 4,479,192 | 10/1984 | Yamagami ..................... 364/520 |
| 4,593,406 | 6/1986 | Stone ............................... 382/44 |
| 4,602,346 | 7/1986 | Kawakami et al. ............. 382/47 X |
| 4,631,750 | 12/1986 | Gabriel et al. ................. 382/44 X |
| 4,644,582 | 2/1987 | Morishita et al. .............. 382/44 X |
| 4,672,680 | 6/1987 | Middleton ....................... 382/44 |

FOREIGN PATENT DOCUMENTS 206884 11/1984 Japan .

OTHER PUBLICATIONS

"Principles of Interactive Computer Graphics," W. M. Newman et al., pp. 27–28 and 232–243, 1979.
"A Linear Algorithm for Incremental Digital Display of Circular Arcs" J. Bresenham, pp. 100–106, Feb. 1977.
"On Linear Difference Curves", D. Cohen, 1969.

*Primary Examiner*—H. A. Herndon
*Attorney, Agent, or Firm*—Thomas P. Dowd

[57] ABSTRACT

A method for generating a circular or elliptic arc on a digital display, especially adapted for use in a scan conversion painting system. A modified DDA method has been provided, whereby each of the intersections between scan lines and curves concerned is represented by a single point.

20 Claims, 10 Drawing Sheets

SYSTEM FOR GENERATING A CIRCULAR OR ELLIPTIC ARC ON A DIGITAL DISPLAY

FIELD OF THE INVENTION

The present invention to a system for generating a circular or elliptic arc on a digital display, such as a cathode ray tube display, a digital plotter, or a matrix printer, and especially to a method and means adapted for use in painting the whole or part of a circle or ellipse.

BACKGROUND OF THE INVENTION

In the prior art, a painted pattern has generally presented on a digital display by: drawing the boundary of a pattern to be painted; discriminating between the area inside of the boundary, which is to be painted, and the area outside thereof, which is not to be painted, in accordance with the data read out from a display memory; and then painting the area inside of the boundary. An example, of such a method is disclosed in Japanese Patent Unexamined Published Application No. 142585/81. This method is time-consuming since it requires that data be read out from the display memory in series. Further, the painting of a pattern by such a method, which largely depends on the contents already drawn on a display screen, may often be interfered with by another pattern.

Another known method for displaying a painted pattern is a scan conversion method. This method is described, for example, in "Principles of Interactive Computer Graphics", W. M. Newman et al, McGraw-Hill 2nd Edition, 1979, pp. 232-243. In this method, all the intersections between the pattern to be painted and the scan lines constituting a display screen are obtained, and the spaces between the odd-even paired intersections are painted. FIG. 2 illustrates a typical example thereof. This method effectively utilizes the geometrical nature of the pattern to be painted to enable the painting to be executed independently of the data stored in a display memory, resulting in its improved processing speed. It is essential to improvement of the scan conversion method to improve the efficiency in the calculation of intersections while retaining its high accuracy.

The present invention is directed to the scan conversion method, and introduces a new concept in generating a circular or elliptic arc in order to solve the problems of accuracy encountered in the past.

In the prior art, several efficient methods have been proposed for drawing a circle with a designated center and a designated radius (or an ellipse with a designated center and designated major and minor axes) with high accuracy without employing the calculation of functions such as trigonometric functions.

One of the methods involves moving a point incrementally from a starting point to a terminating point in order to obtain a desired line segment. The incremental movement of the point may, for example, take the form of a movement from one picture element (hereinafter referred to as a pel) to any one of the neighboring pels at the angular positions of 0, 90, 180, and 270 degrees. This combination is called "4-connected pels". The incremental movement may also be made from one pel to any one of those at the angular positions of 0, 45, 90, and at 45 degree intervals to 315 degrees. This combination is called "8-connected pels." In selecting the next pel to which the movement is to be made, a test is performed to select two or three neighboring pels as candidates. Then, the distances between each of the candidates and the actual line segment concerned are obtained and the pel with the smallest distance therebetween is finally selected. Such a method is described in "A Linear Algorithm for Incremental Digital Display of Circular Arcs", J. E. Bresenham, Communications of the ACM, 20 (2), February 1977, pp. 100-106, for example. Although the basic concept of such a method may be applied for painting a circular or elliptic arc by the scan conversion method, such an application must be modified in order to eliminate some problems of accuracy as explained below.

For example, when a circle is generated with 4-connected pels, a series of points as shown in FIG. 3 are obtained. Now consider the case of painting using a series of points generated counterclockwise from a point x=r on the x-axis. As understood from FIG. 2, in the case of the scan conversion method, only one point is required to be generated at the intersection of each scan line and the curve concerned. Therefore, when a plurality of points are generated on one scan line at such an intersection, it is necessary to select one of them. For example, if the points displayed in the y-axis direction are selected, the points as shown in black in FIG. 4 are selected. (The points shown with double circles must be added in accordance with the sign of differential in the y-axis direction, so that an even number of points always exist on one scan line). It will be seen that this results in producing a distorted circle rather than a true circle. The more vertically depressed is an ellipse of the pattern to be displayed, the more significant effect would be produced (FIG. 6).

Considering the symmetry of a circle, assume that a series of points only in the first quadrant (quarter circle) are generated actually and the coordinates of the points in the other quadrants are obtained only by inverting the sign of the coordinates of those in the first quadrant. With this method, it is possible to obtain paired points immediately after the generation of each point and to paint the space between the paired points, resulting in the reduction of the processing time. This method enables the obtaining of a symmetrical pattern. However, the obtained circle would be depressed vertically (FIG. 5).

The foregoing method would not provide a good solution to the aforementioned problems and some other modification would be required to obtain a highly precise scan conversion of a circle or ellipse. The best method therefor would be to obtain a single point nearest to each of the intersections between a circle and each scan line, sequentially. However, in order to obtain such points directly from the equation of a circle, $$y = \sqrt{r^2 - x^2},$$

it is necessary to calculate square roots.

Another known method for generating a circle conveniently is the DDA (Digital Differential Analyzer) method, which is described in the before mentioned "Principles of Interactive Computer Graphics", W. M. Newman et al, pp. 27-28, and referred to below briefly.

Referring to FIG. 7, assume a point $p_k(x_k, y_k)$ located on the circumference of a circle with a radius r has been obtained. The movement of the point by $\Delta\theta$ from the point $p_k$ counterclockwise on the circle to point $p_{k+1}(x_{k+1}, y_{k+1})$ is expressed by the following formulae:

$$x_{k+1} = r\cos(\theta + \Delta\theta) \qquad [1]$$
$$= r\cos\theta\cos\Delta\theta - r\sin\theta\sin\Delta\theta$$
$$= x_k\cos\Delta\theta - y_k\sin\Delta\theta$$

$$y_{k+1} = r\sin(\theta + \Delta\theta) \qquad [2]$$
$$= r\sin\theta\cos\Delta\theta + r\cos\theta\sin\Delta\theta$$
$$= y_k\cos\Delta\theta + x_k\sin\Delta\theta$$

Assuming that $\Delta\theta$ in the above formulae is a minute angle, $\cos\Delta\theta = 1$ and $\sin\Delta\theta = \Delta\theta$. Further, assuming $\Delta\theta = e = 2^{-m}$ (m is a positive integer), the following formulae are obtained:

$$x_{k+1} = x_k - ey_k \qquad [3]$$

$$y_{k+1} = y_k + ex_k \qquad [4]$$

wherein $2^{m-1} \leq r \leq 2^m$. However, the $x_k$ in the above formulae (4) must be substituted for by $x_{k+1}$ in order to prevent a diversion, and the following formulae are obtained.

$$x_{k+1} = x_k - ey_k \qquad [5]$$

$$y_{k+1} = y_k + ex_{k+1} \qquad [6]$$

It has been ascertained that the values of a true circle can be obtained from the foregoing formulae [5] and (6).

It has already been proposed to apply the DDA method to the scan conversion method, as disclosed, for example, in Japanese Patent Unexamined Publication Application No. 206884/84. However, in this case, a plurality of points are generated at the intersection of a scan line and the curve concerned, resulting in the same problem as in the case of the above-mentioned incremental digital display. The above-mentioned Japanese Patent Unexamined Publication Application No. 206884/84 does not refer to such a problem.

As a consequence of the foregoing known difficulties in the prior art, it is in an object of the present invention to provide a method for generating a circular or elliptic arc, which is adapted for the scan conversion method without the necessity of calculating trigonometric functions and square roots.

SUMMARY OF THE INVENTION

In order to accomplish the above object, the present invention is designed to prevent a plurality of points from being generated at the intersection between a scan line and the curve concerned by modifying the recurrence formulae of the DDA method.

More specifically, the present invention employs the following recurrence formulae (7) and (8) or (9) and (10) to obtain a series of points for a circle:

$$y_{k+1} = y_k + 1 \qquad [7]$$

$$x_{k+1} = x_k - y_{k+1}/x_k \qquad [8]$$

$$y_{k+1} = y_k - 1 \qquad [9]$$

$$x_{k+1} = x_k + y_{k+1}/x_k \qquad [10]$$

wherein $k = 0, 1, 2, \ldots$ and $x_k \neq 0$.

Linear painting with the scan conversion method is performed in the x-axis direction, which is orthogonal to the y-axis direction.

The above formulae (7) and (8) are explained as follows.

Consider again the above-mentioned recurrence formulae (3), (4), (5), and (6).

$$x_{k+1} = x_k - ey_k$$

$$y_{k+1} = y_k + ex_k$$

$$x_{k+1} = x_k - ey_k$$

$$y_{k+1} = y_k + 3x_{k+1}$$

As will be understood from formulae (3) and (4), the vector $(x_{k+1}, y_{k+1})$ equals the vector $(x_k, y_k)$ plus the minute vector $(-ey_k, ex_k)$. The minute vector $(-ey_k, ex_k)$ is orthogonal to the vector $(x_k, y_k)$. Therefore, the series of points obtained from formulae (3) and (4) will be diverted. The formulae (5) and (6) eliminate such a diversion. Namely, formulae (5) and 96) may be expressed by a matrix as follows:

$$[x_{k+1}, y_{k+1}] = [x_k, y_k] \begin{bmatrix} 1 & e \\ -e & 1-e^2 \end{bmatrix} \qquad [11]$$

In formula (11), since $$det \begin{bmatrix} 1 & e \\ -e & 1-e^2 \end{bmatrix}$$

is 1, it is apparent that the series of points generated from formula (11) generate a true circle. This is described in "On Linear Difference Curves", D. Cohen, Department of Engineering Application Mathematics, Harvard University, 1969.

When an increment unit in the y-axis direction is 1 in the formula (6), that is, it is desired to generate a single point on one scan line, a problem occurs. Namely, if the increment unit is 1, namely $ex_{k+1} = 1$, the above formuala (5) is expressed as follows:

$$x_{k+1} = x_k - y_k/x_{k+1}$$

As seen from this formula, it would be unreasonable that $x_{k+1}$ is required $x_{k+1}$.

The present invention is based on the following formulae wherein $y_k$ in the formula (3) is substituted for by $y_{k+1}$:

$$x_{k+1} = x_k - ey_{k+1} \qquad [12]$$

$$y_{k+1} = y_k + ex_k \qquad [13]$$

$$[x_{k+1}, y_{k+1}] = [x_k, y_k] \begin{bmatrix} 1-e^2 & e \\ -e & 1 \end{bmatrix} \qquad [14]$$

Of course, formula (14), wherein $$det \begin{bmatrix} 1 - e^2 & e \\ -e & 1 \end{bmatrix} = 1,$$

generates a true circle.

Further, if the increment unit in the y-axis direction is 1 in the formulae (12) and (13), namely $ex_k = 1$, the formulae (7) and (8) are obtained.

As apparent from the above description, the formulae (7) and (8) can generate a true circle by plotting a single point at each intersection with a scan line.

The formulae (7) and (8) are those for plotting a circle counterclockwise and the formulae (9) and (10) are those for plotting a circle clockwise.

In order to draw a circle actually, it is necessary to make translational movements since the center is not always at the original point. Further, in the case of an ellipse, it is required to make scale conversions depending upon the length of the major or minor axis.

DESCRIPTION OF THE PREFERRED EMBODIMENTS

Figure 8:
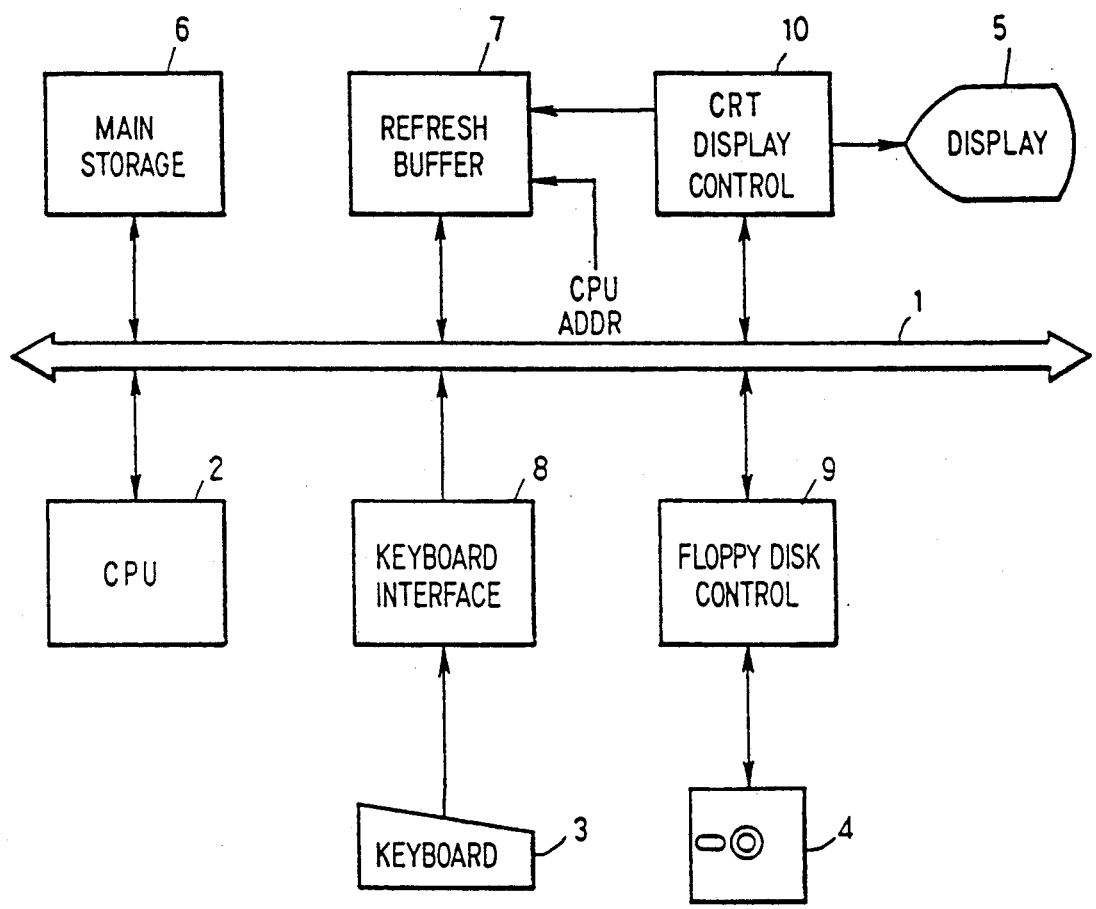
FIG. 8 shows a block diagram schematically illustrating a system which may be used to implement the embodiment shown in FIG. 1.
Figure 9:
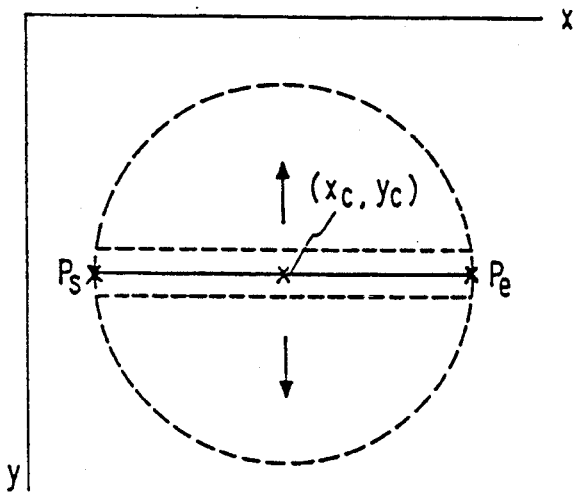
FIGS. 9 through 12 are diagrams for explaining the embodiment shown in FIG. 1.
Figure 10:
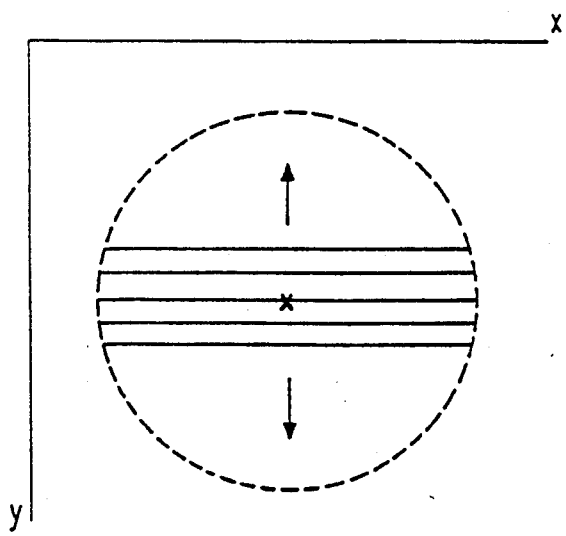
Figure 11:
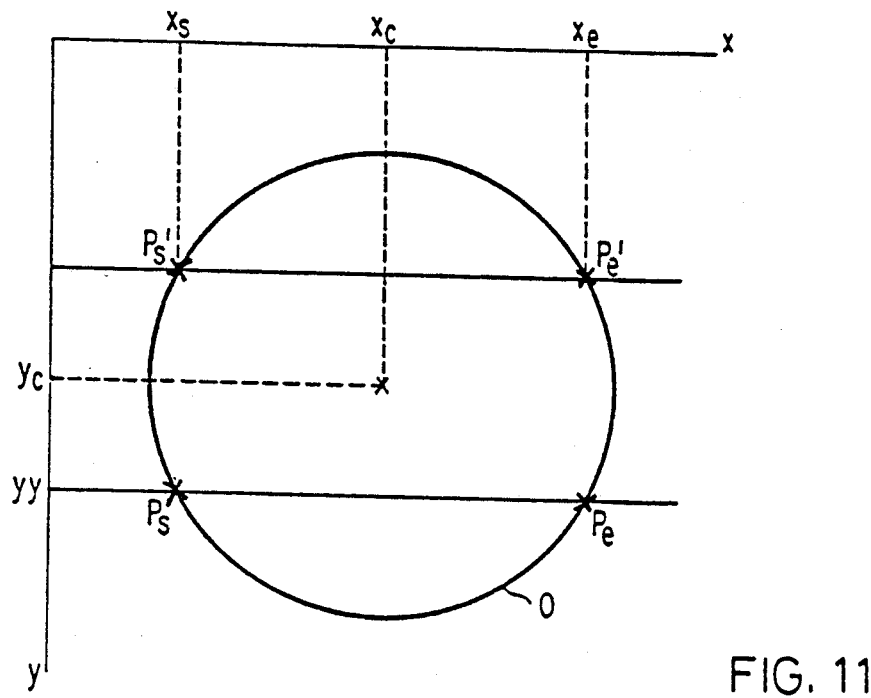

Referring now to FIG. 1 and FIGS. 8 through 12, an embodiment of the present invention as applied to painting a circle will be described. In this embodiment, the pels on the scan line passing through the center $(x_c, y_c)$ of a circle are painted from a point $p_s$ through a point $p_e$, as shown in FIG. 9, and thereafter the pels on the adjacent scan lines upwardly and downwardly are sequentially painted, as shown in FIG. 10. More particularly, as shown in FIG. 11, after the point $p_s$ on a desired circle is determined, the points $p_e, p_{s'}$, and $p_{e'}$ are obtained by employing the symmetry of a circle. Then, the pels between the points $p_s$ and $p_e$ as well as the pels between the points $p_{s'}$ and $p_{e'}$ are painted. The symbols to be used in the description of this embodiment are shown in FIG. 11.

FIG. 8 shows generally a personal computer system employed to implement this embodiment of the invention. The system may be an IBM 5550 manufactured by IBM Japan, Ltd. In the figure, a CPU 2, a keyboard 3, a floppy disk drive 4, a CRT display 5, a main storage 6, a refresh buffer 7, and so on are connected to a data bus 1. A keyboard interface 8, a floppy disk controller 9, and a CRT display controller 10 are provided as interfaces between the data bus 1 and each of the keyboard 3, floppy disk drive 4, and CRT display 5, respectively.

In the figure, an address bus, a control bus, ROM, and so on are not shown.

The CRT display 5 may be of the 15 inch-monochrome type, which is capable of displaying 1024×768 points or pels with a spot size of approximately 0.22 mm. The refresh buffer 7 has a capacity which is able to support the all point addressable graphic mode. The refresh buffer 7 can be addressed by the CPU 2 and the CRT display controller 10, and the graphic data can be written into or read from the refresh buffer 7 by CPU addresses. The CRT display controller 10 accesses the refresh buffer 7 according to the vertical-synchronizing signals and the horizontal-synchronizing signals for the CRT display 5, and displays the contents on the CRT display 5. The method of the present invention may be implemented, for example, as a package disk for an application program. When the package disk is loaded in a floppy disk drive 4 under the control of a disk operating system, the program is transferred to the main storage 6 and then executed. The method of this embodiment is shown in detail in FIG. 1.

In this embodiment, a point $p_s$ on a desired circle O is obtained a point (x,y) on a circle O' with a radius r and an original point (0,0) at its center by the modified DDA method, and then translating the point. Of course, the points $p_e, p_{s'},$ and $p_{e'}$ can be further obtained based on the point $p_s$ in the same manner (see FIG. 11).

Returning to FIG. 1, the steps of the method of this embodiment will be described. In the step 11, the keyboard 3 is used to input the data of the center $(x_c, y_c)$ and the radius r of the circle to be painted. As a result, the data $x_c y_c$, and r are transferred to the main storage 6. Then, in the step 12, the point (x,y) on the circle O' and the counter C are initialized to (r, 0) and 0, respectively. Since the point (r,0) on the x-axis is used as the starting point for incrementation, the radius data can be employed directly as the initialization data. If a point on the circle O' which is not located on the x or y-axis is used as such a starting point, the calculation of square roots are required to obtain the initialization data, thereby rendering the method complicated.

Next, in the step 13, the data $y_c, x_c - r$, and $r + x_c$ for the intersections $p_s$ and $p_e$ between the scan line passing through the center $(x_c, y_c)$ and the circle 0 are substituted for by $y_y, x_s$, and $x_e$, respectively. Then, in the step 14, the painting data is written into the locations of the refresh buffer 7 corresponding to the pels between the point $(x_s, y_c)$ through the point $(x_e, y_c)$. At this stage, the painting of one scan line shown in FIG. 9 has been completed. Thereafter, the scan conversions will be continued for the adjacent scan lines upwardly or downwardly.

Namely, in the step 15, the counter C and the value of the y coordinate y of the point on the circle O' are respectively incremented by one, and the value of x coordinate x of the point on the circle O' is substituted for by $x - y/x$. Then, in the step 16, $y_y, x_s$, and $x_e$ are substituted for by $y + y_c, x_c - [x]$, and $[x] + x_c$, respectively. The [x] indicates the integer part of x. It is apparent that the above operation has been made to obtain the intersections $p_s$ and $p_e$ between the scan line and the circle O after the incrementation by one. Then, in the step 17, the painting for the scan line after the incrementation is performed. Namely, the painting data is written into the locations of the refresh buffer 7 corresponding to the pels between the point $p_s(x_s, y_y)$ through the point $p_e(x_e, y_y)$.

In the steps 18 and 19, the painting is made for the scan line between the point $p_z$, and the point $p_{e'}$. Namely, since the line segment $\overline{p_s p_e}$ is symmetrical with the line segment $\overline{p_s p_{e'}}$ about the x-axis, $y_y$ is substituted for by $y_c - y$ (step 18). Then, in the step 19, the painting is made in the same manner as in the step 17.

Figure 12:
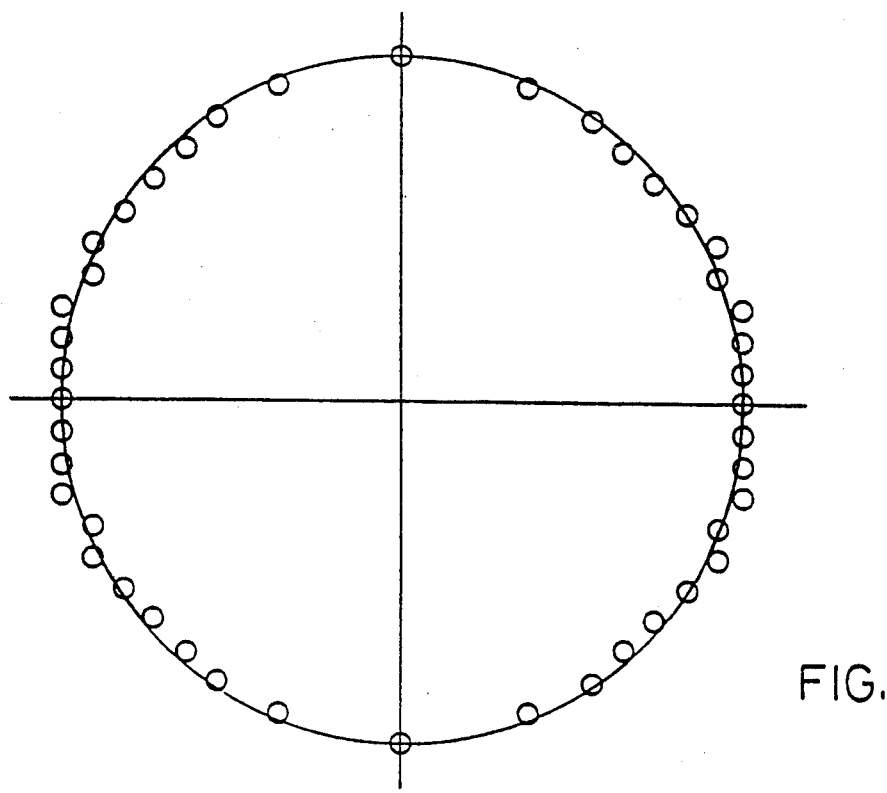

The above steps 15 through 19 are repeated until the counter C becomes equal to $r-1$, in the step 20. When the counter C becomes equal to $r-1$, the steps 21 and 22 are executed, and the operation is completed. In the steps 21 and 22, the painting data is written into the locations of the refresh buffer 7 corresponding to the points $(r+y_c, x_c)$ and $(y_3-r, x_c)$, respectively. In this manner, the points along the circle O, as shown by small circles in FIG. 12, are plotted, and the spaces between each pair of the plotted pointed on the same scan line are painted. The pained circle is displayed on the CRT display 5.

Figure 1:
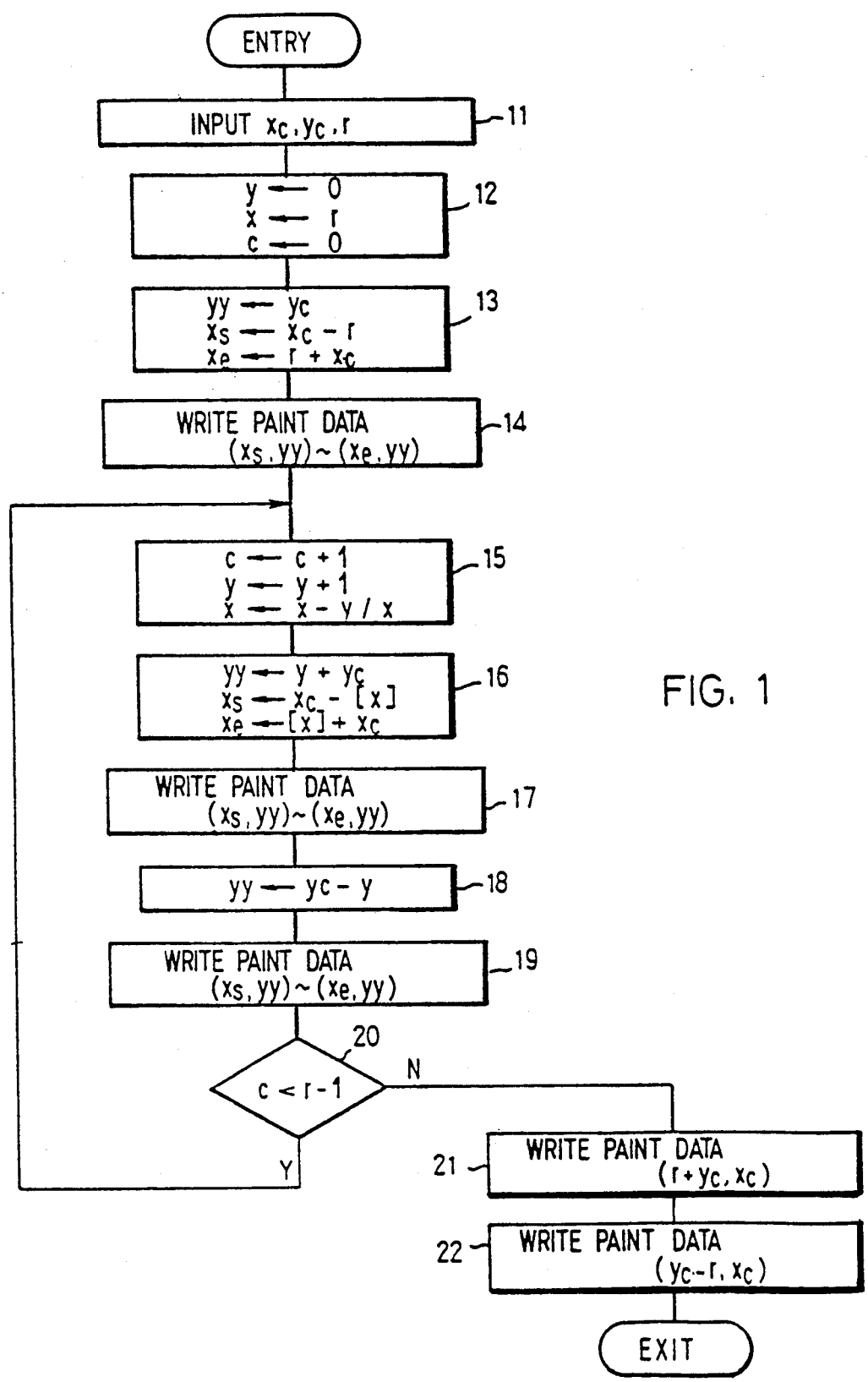
FIG. 1 shows a flow chart illustrating an embodiment of the present invention for painting circle.
Figure 2:
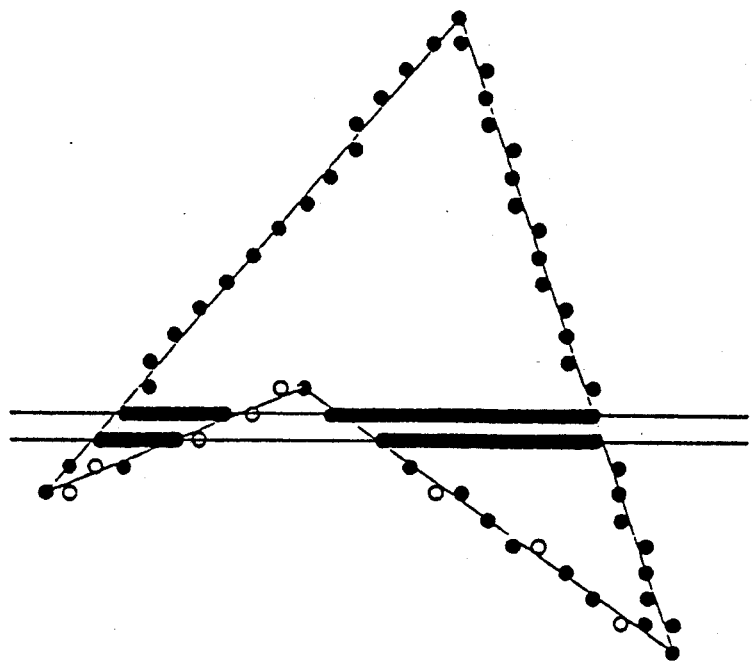
FIGS. 2 through 7 are diagrams for explaining the prior art.
Figure 3:
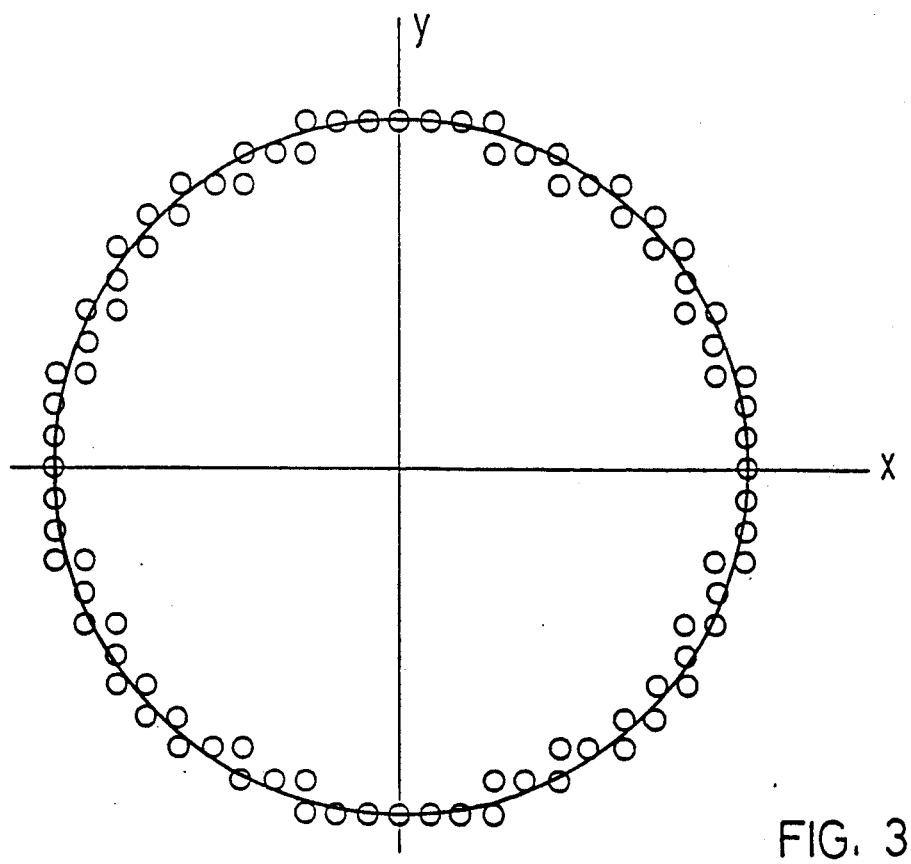
Figure 4:
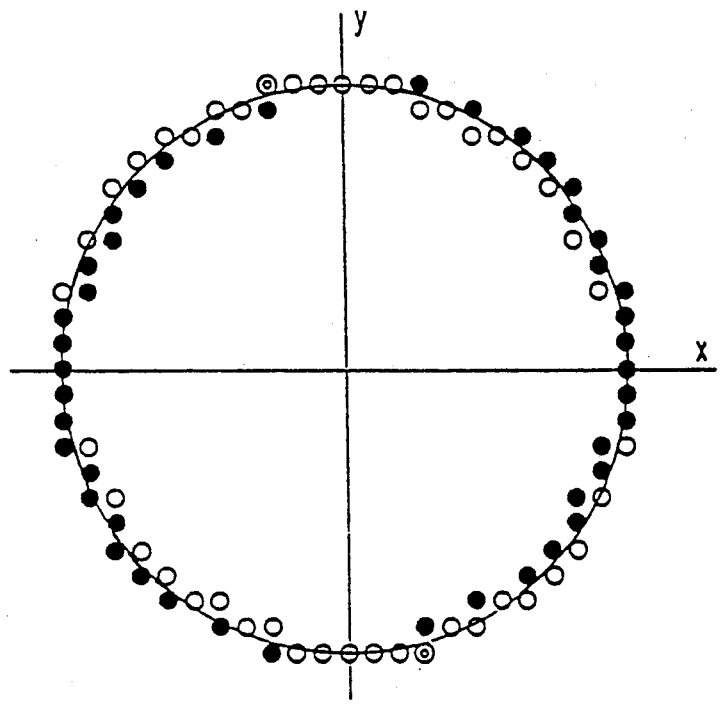
Figure 5:
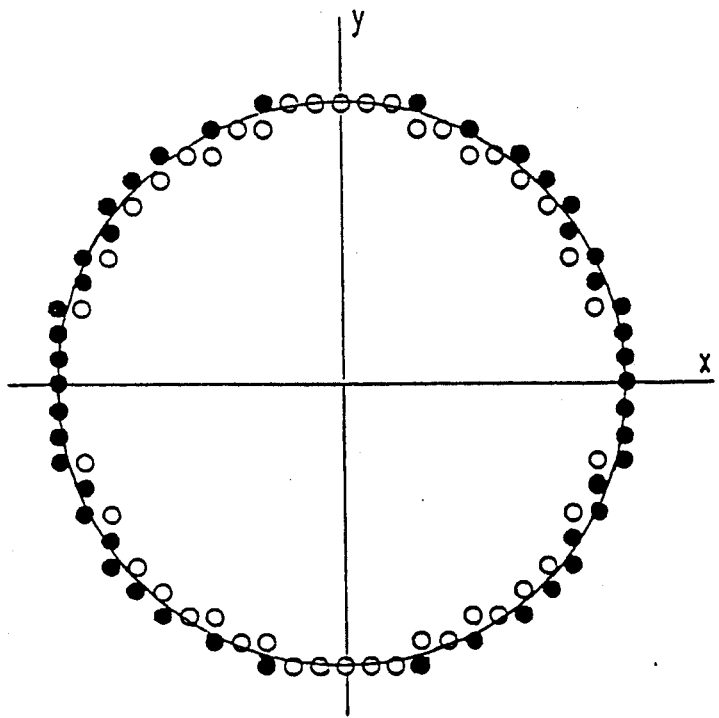
Figure 6:
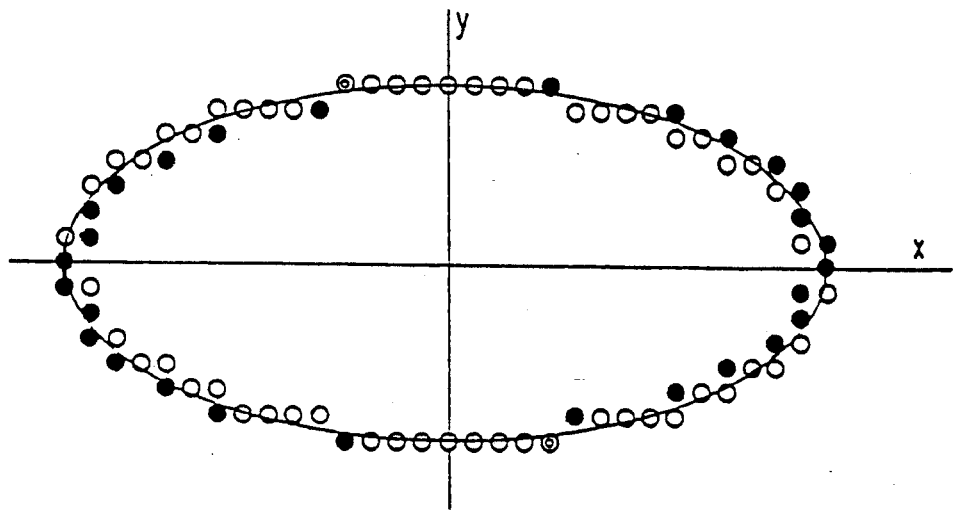
Figure 7:
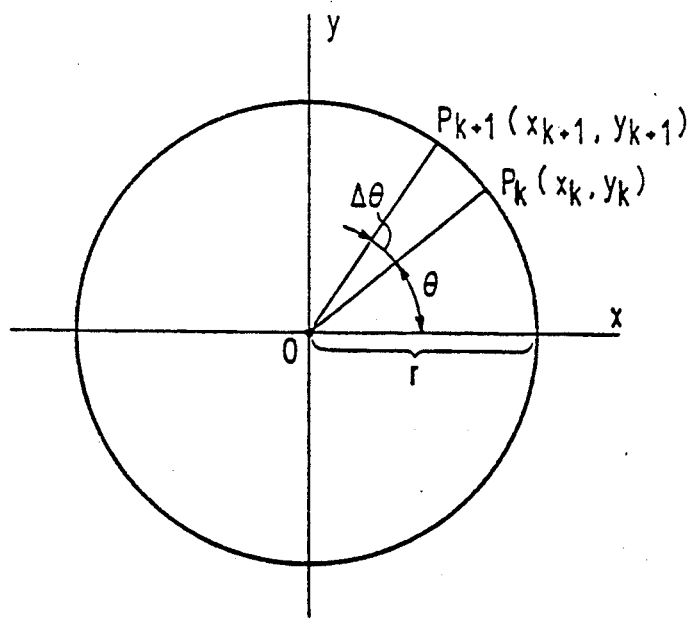
Figure 14:
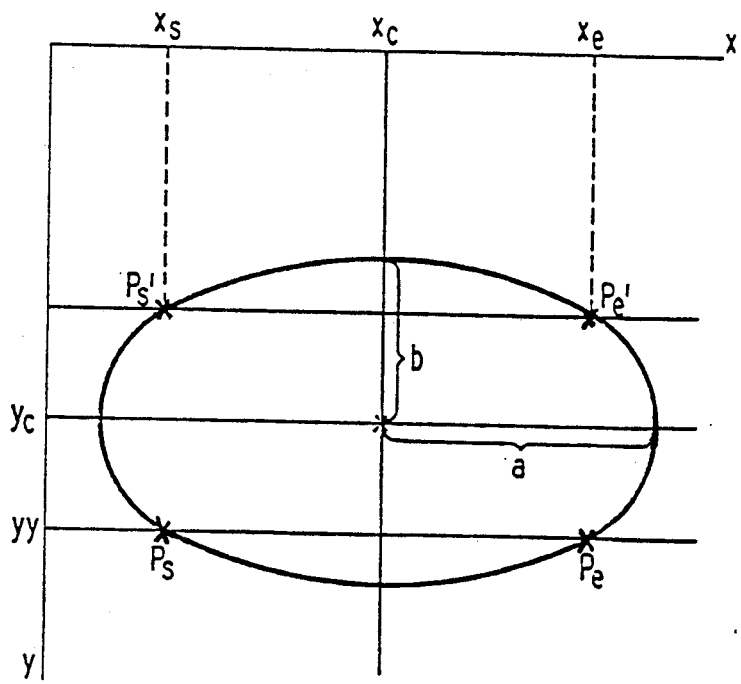
FIGS. 14 and 15 are diagrams for explaining the embodiment shown in FIG. 13.
Figure 13:
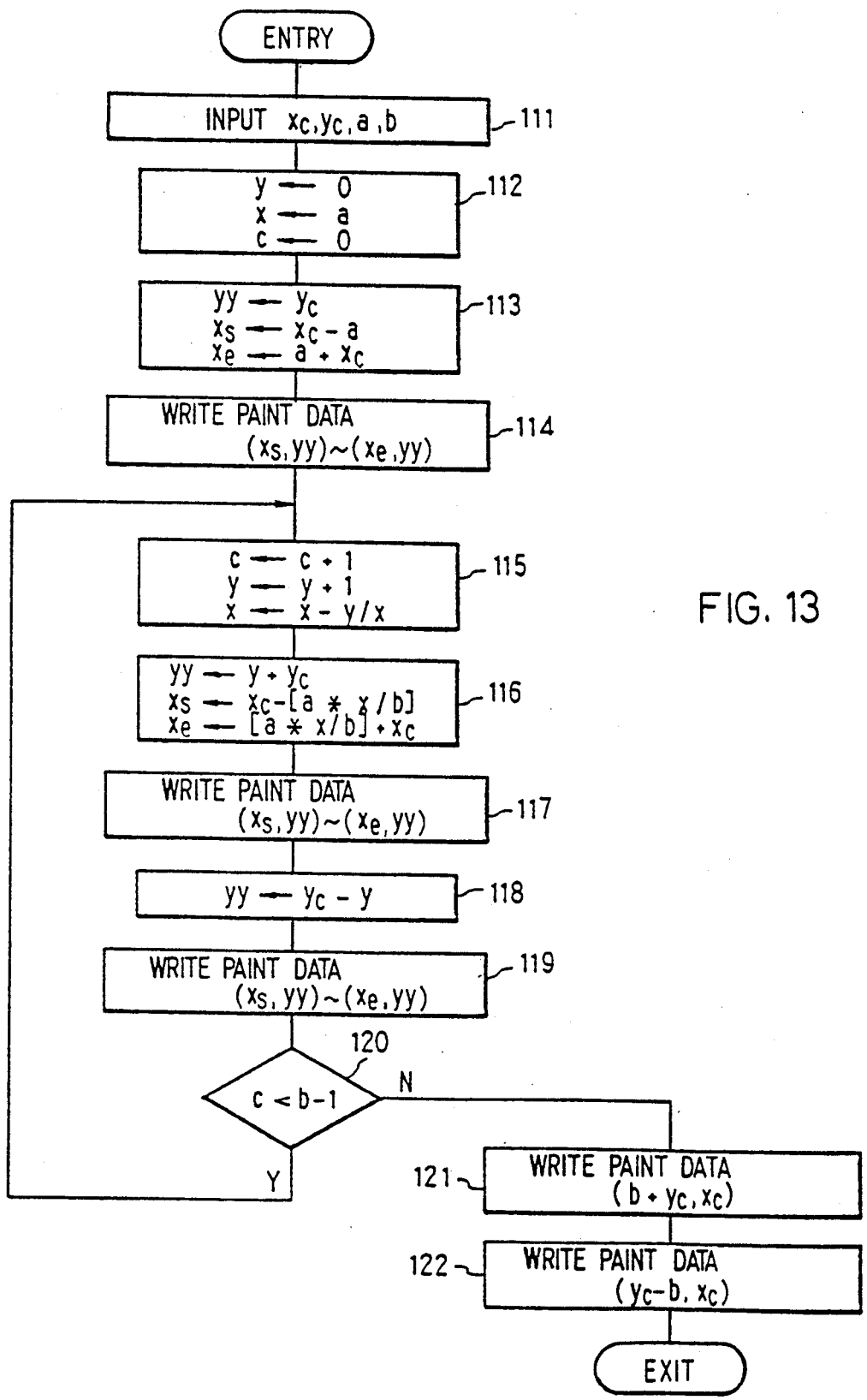
FIG. 13 shows a flow chart illustrating another embodiment of the present invention for painting an ellipse.

Next, referring to FIGS. 13, through 15, another embodiment of the present invention as applied to painting an ellipse will be described. In this embodiment, an ellipse as shown in FIG. 14 is painted. In FIG. 13, the steps that are similar to those in FIG. 1 are identified by the numerals with 100 added, and only the portions differing from the preceding embodiment will be explained below.

As shown in FIG. 13, in the step 111, the keyboard 3 is used to input the data of the center $(x_c, y_c)$ and the major and minor axes $2a$ and $2b$. In the step 113, $y_y, x_s,$ and $x_e$ are substituted for by $y_c, x_c-a$ and $a+x_c$, respectively.

In the step 116, $x_c - [a*x/b]$ and $[a*x/b] + x_c$ are substituted for $x_s$ and $x_e$, respectively.

Further, in the steps 121 and 122, the painting data is written into the locations of the refresh buffer 7 corresponding to the points $(b+y_c, x_c)$ and $(y_c-b, x_c)$.

Figure 15:
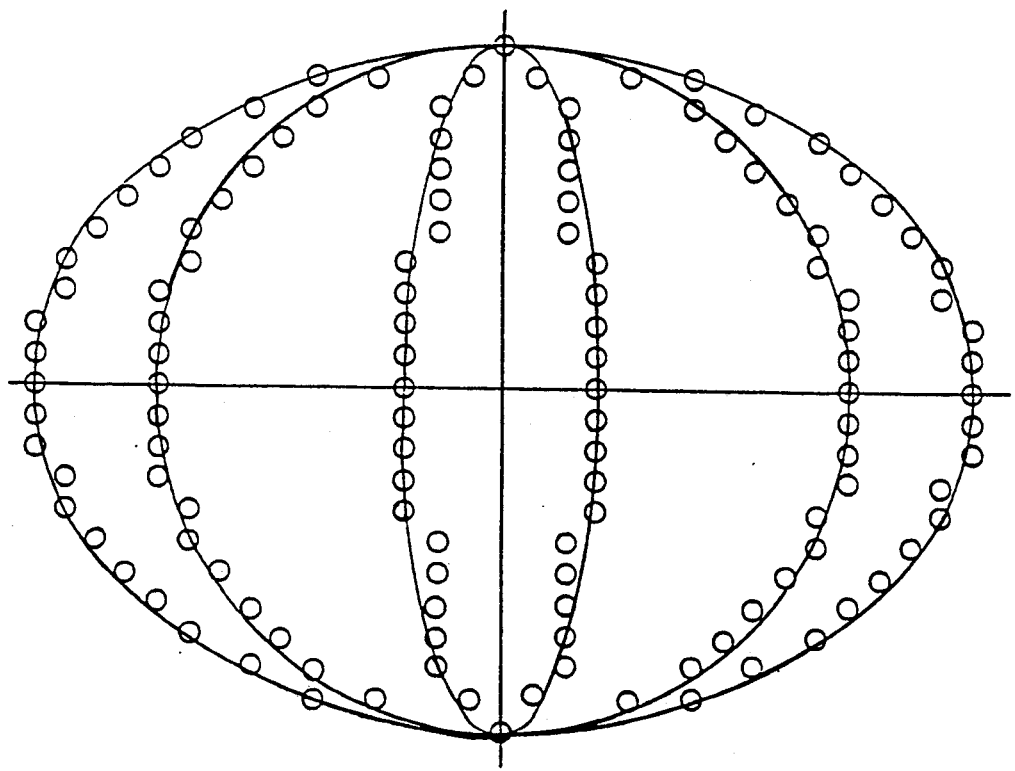

According to the sequence in FIG. 13, an ellipse as shown in FIG. 15 is obtained, and the inside of the ellipse is painted.

Figure 16:
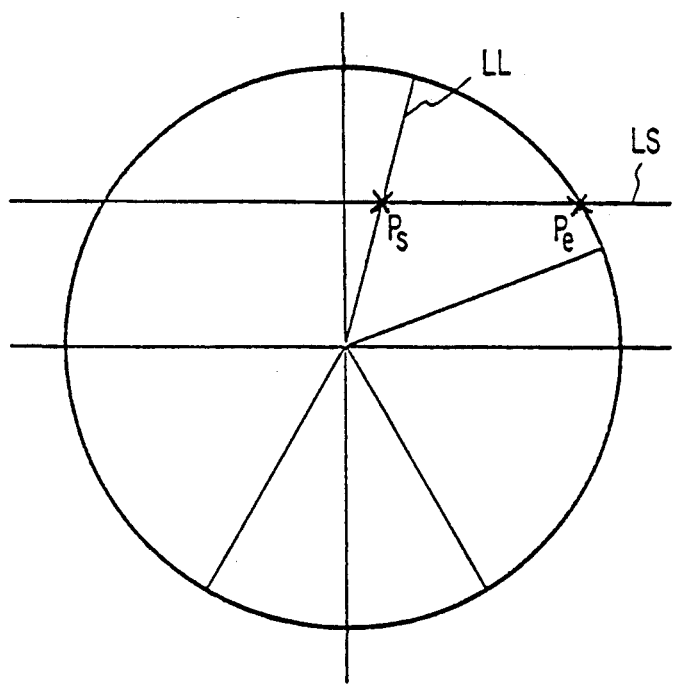
FIG. 16 is a diagram for explaining a modification of the embodiment shown in FIG. 1.

While the above-described embodiments of the present invention have been explained in terms of painting the whole of a circle or an ellipse, the present invention could also be used for painting a pie chart as shown in FIG. 16. In such a case, a table is made as to the odd - even paired intersections on the scan lines which are to be painted therebetween, and based on the table, the painting data is written into the refresh buffer 7. For example, the intersection between the scan line LS and the circle O may be obtained by the method of the present invention and intersection between the straight line LL and the scan line LS may be obtained by any known method such as Bresenham's method, and the data stored in a table. It is also possible to obtain a pie chart made from an ellipse in the same manner.

As described above, the present invention makes it possible to generate a highly precise circle or ellipse, and is adapted for use in the scan conversion method since an intersection between a scan line and a curve concerned is defined as a single point rather than as a plurality of points. Further, the present invention makes it possible to generate a circle or an ellipse in a short period of time without necessitating the calculation of square and trigonometric functions.

While the invention has been shown and described with reference to preferred embodiments thereof, it will be understood that various substitutions in form and detail may be made by those skilled in the art without departing from the spirit and scope of the invention.

Having thus described our invention, what we claim as new and desire to secure by Letters Patent is:

1. A computerized method for automatically generating a desired circular arc on a raster scan digital display having a plurality of pels, each of the pels being designated by two-dimensional coordinates, said method comprising the steps of:

obtaining input information identifying 1) the outline of a figure to be painted on said display comprising said desired arc, 2) the pel positions of the points of intersection between said outline and the display scan lines, and 3) the pairing of said pel positions, said input information including input data representing the two-dimensional coordinates $(x_c, y_c)$ of the center and representing the radius r of said desired arc on said display;

generating digitized image data in the form of a group of two-dimensional coordinates $(x_k, y_k)$, where $k=0, 1, 2,$ etc., said group of coordinates representing a series of pels for defining a digitized imaginary arc corresponding to said desired arc, having said radius r and the center positioned on two-dimensional initial coordinates $(0,0)$, in accordance with the following recurrence formulae, $$y_{k+1} = y_k + 1$$

$$x_{k+1} = x_k - y_{k+1}/x_k$$

for counterclockwise generation and $$y_{k+1} = y_k - 1$$

$$x_{k+1} = x_k + y_{k+1}/x_k$$

for clockwise generation, where $x_k \neq 0$;

transforming said generated image data by respectively displacing each of said group of coordinates $(x_k, y_k)$ to other coordinates determined by a vector distance between said initial coordinates $(0,0)$ and said input data coordinates $(x_c, y_c)$; and generating a circular arc on said raster scan digital display by selecting the appropriate pels using the coordinates of said transformed image data whereby said desired arc is generated on said display.

2. A method according to claim 1, wherein the coordinates $(x_k, y_k)$ of the first one of said series of pels are initialized to $(r, 0)$.

3. A method according to claim 1, wherein said transforming step is carried out by adding each of said group of coordinates $(x_k, y_k)$ to said input data coordinates $(x_c, y_c)$ respectively.

4. A method according to claim 1, wherein the coordinates $(x_k, y_k)$ of the first one of said series of pels are initialized to $(-r, 0)$.

5. A method according to claim 1, wherein said transforming step is carried out by subtracting each of said group of coordinates $(x_k, y_k)$ from said input data coordinates $(x_c, y_c)$ respectively.

6. A computerized method for automatically generating a desired elliptical arc on a raster scan digital display having a plurality of pels, each of the pels being designated by two-dimensional coordinates, said method comprising the steps of:

obtaining input information identifying 1) the outline of a figure to be painted on said display containing said arc, 2) the pel positions of the points of intersection between the outline and the display scan lines, and 3) the pairing of said pel positions, said input information including input data representing two-dimensional coordinates $(x_c, y_c)$ of the center as well as the semimajor axis a and the semiminor axis b of said desired arc on said display; generating digitized image data in the form of a group of two-dimensional coordinates $(x_k, y_k)$, where $k=0, 1, 2$, etc., said group of coordinates representing a series of pels for defining a digitized imaginary elliptical arc, having a radius equal to said semimajor axis a and the center positioned on two-dimensional original coordinates (0,0), in accordance with the following recurrence formulae, $$y_{k+1} = y_k + 1$$

$$x_{k+1} = x_k - y_{k+1}/x_k$$

for counterclockwise generation and $$y_{k+1} = y_k - 1$$

$$x_{k+1} = x_k + y_{k+1}/x_k$$

for clockwise generation, where $x_k \neq 0$;

transforming said generated image data by respectively displacing each of said group of coordinates $(x_k, y_k)$ to other coordinates determined by a vector distance between said initial coordinates (0,0) and said input data coordinates $(x_c, y_c)$;

performing scale conversion of said transformed image data in accordance with a predetermined scaling factor based on the semimajor and semiminor axes, a and b; and generating an elliptical arc on said raster scan digital display by selecting the appropriate pels using the coordinates of said scaled and transformed original image data whereby said desired arc is generated on said display.

7. A method according to claim 6, wherein the coordinates $(x_k, y_k)$, of the first one of said series of pels are initialized to (a,0).

8. A method according to claim 6, wherein said transforming step is carried out by adding each of said group of coordinates $(x_k, y_k)$ to said input data coordinates $(x_c, y_c)$ respectively.

9. A method according to claim 6, wherein the coordinates $(x_k, y_k)$ of the first one of said series of pels are initialized to (−a,0).

10. A method according to claim 6, wherein said transforming step is carried out by subtracting each of said group of coordinates $(x_k, y_k)$ from said input data coordinates $(x_c, y_c)$ respectively.

11. A computerized system for automatically generating a desired circular arc on a raster scan digital display having a plurality of pels, each of the pels being designated by two-dimensional coordinates, said system comprising:

means for receiving input information identifying 1) the outline of a figure to be painted on said display comprising said desired arc, 2) the pel positions of the points of intersection between said outline and the display scan lines, and 3) the pairing of said pel positions, said input information including input data representing the two-dimensional coordinates $(x_c, y_3)$ of the center and representing the radius r of said desired arc on said display;

means for generating digitized image data in the form of a group of two-dimensional coordinates $(x_k, y_k)$, where $k=0, 1, 2$, etc., said group of coordinates representing a series of pels for defining a digitized imaginary arc corresponding to said desired arc, having said radius r and the center positioned on two-dimensional initial coordinates (0,0), in accordance with the following recurrence formulae, $$y_{k+1} = y_k + 1$$

$$x_{k+1} = x_k - y_{k+1}/x_k$$

for counterclockwise generation and $$y_{k+1} = y_k - 1$$

$$x_{y+1} = x_k + y_{k+1}/x_k$$

for clockwise generation, where $x_k \neq 0$;

means for transforming said generated image data by respectively displacing each of said group of coordinates $(x_k, y_k)$ to other coordinates determined by a vector distance between said initial coordinates (0,0) and said input data coordinates $(x_c, y_c)$; and means for generating a circular arc on said raster scan digital display using the coordinates of said transformed image data to select the appropriate pels whereby said desired arc is generated on said digital display.

12. A system according to claim 11, wherein said transforming means carries out the transforming by adding each of said group of coordinates $(x_k, y_k)$ to said input data coordinates $(x_c, y_c)$ respectively.

13. A system according to claim 11, wherein said transforming means carries out the transforming by subtracting each of said group of coordinates $(x_y, y_k)$ from said input data coordinates $(x_c, y_c)$ respectively.

14. A system according to claim 11, wherein the coordinates $(x_k, y_k)$ of the first one of said series of pels are initialized to (r, 0).

15. A system according to claim 11, wherein the coordinates $(x_k, y_k)$ of the first one of said series of pels are initialized to (−r, 0).

16. A system according to claim 11, wherein said transforming means carries out the transforming by subtracting each of said group of coordinates $(x_k, y_k)$ from said input data coordinates $(x_c, y_c)$ respectively.

17. A computerized system for automatically generating a desired elliptical arc on a raster scan digital display having a plurality of pels, each of the pels being designated by two-dimensional coordinates, said system comprising:

means for receiving input information identifying 1) the outline of a figure to be painted on said display containing said arc, 2) the pel positions of the points of intersection between the outline and the display scan lines, and 3) the pairing of said pel positions, said input information including input data representing two-dimensional coordinates $(x_c, y_c)$ of the center as well as the semimajor axis a and the semiminor axis b of said desired arc on said display;

means for generating digitized image data in the form of a group of two-dimensional coordinates $(x_k, y_k)$, where $k=0, 1, 2$, etc., said group of coordinates representing a series of pels for defining a digitized imaginary elliptical arc, having a radius equal to said semimajor axis a and the center positioned on two-dimensional original coordinates (0,0), in accordance with the following recurrence formulae, $$y_{k+1} = y_k + 1$$

$$x_{k+1} = x_k - y_{k+1}/x_k$$

for counterclockwise generation and $$y_{k+1} = y_k - 1$$

$$x_{k+1} = x_k + y_{k+1}/x_k$$

for clockwise generation, where $x_k \neq 0$;

means for transforming said generated image data by respectively displacing each of said group of coordinates $(x_k, y_k)$ to other coordinates determined by a vector distance between said initial coordinates (0,0) and said input data coordinates $(x_c, y_c)$;

means for performing scale conversion of said transformed image data in accordance with a predetermined scaling factor based on the semimajor and semiminor axes, a and b; and means for generating an elliptical arc on said raster scan digital display using the coordinates of said scaled and transformed original image data to select the appropriate pels whereby said desired arc is generated on said display.

18. A system according to claim 17, wherein the coordinates $(x_k, y_k)$ of the first one of said series of pels are initialized to (a,0).

19. A system according to claim 17, wherein the coordinates $(x_k, y_k)$ of the first one of said series of pels are initialized to (−a, 0).

20. A system according to claim 17, wherein said transforming means carries out the transforming by adding each of said group of coordinates $(x_k, y_k)$ to said input data coordinates $(x_c, y_c)$ respectively.

* * * * *